United States Patent
Gao

(10) Patent No.: US 6,550,424 B1
(45) Date of Patent: Apr. 22, 2003

(54) FOLDING CAGE

(76) Inventor: Taishan Gao, 6502 #C New London Rd., New Market, MD (US) 21774

(*) Notice: Subject to any disclaimer, the term of this patent is extended or adjusted under 35 U.S.C. 154(b) by 0 days.

(21) Appl. No.: 10/061,323

(22) Filed: Feb. 4, 2002

(51) Int. Cl.[7] .................... A01K 31/08; A01K 1/03
(52) U.S. Cl. ................ 119/474; 119/453; 119/451
(58) Field of Search ..................... 119/474, 461, 119/453, 472, 499, 514; 256/25

(56) References Cited

U.S. PATENT DOCUMENTS

| | | |
|---|---|---|
| 255,089 A | 4/1882 | Franck |
| 1,771,008 A | 6/1930 | Reinhardt |
| 2,364,891 A | 12/1944 | Cooper |
| 2,736,041 A * | 2/1956 | Maloof ................ 5/99.1 |
| 2,783,738 A | 3/1957 | Willeke |
| 2,789,531 A | 4/1957 | Diefendorf |
| 2,864,335 A | 12/1958 | Yellin |
| 3,484,081 A * | 12/1969 | Rowan ................ 256/22 |
| 3,896,766 A | 7/1975 | Martin |
| 4,140,080 A * | 2/1979 | Snader ................ 119/453 |
| 4,527,512 A * | 7/1985 | Sugiura ............... 119/499 |
| 4,577,589 A | 3/1986 | Voss et al. |
| D293,945 S | 1/1988 | Grant |
| 5,010,848 A | 4/1991 | Rankin |
| 5,549,073 A | 8/1996 | Askins et al. |
| 5,950,568 A * | 9/1999 | Axelrod et al. ....... 119/499 |
| 5,957,086 A | 9/1999 | Gallardo |
| 5,966,777 A | 10/1999 | Jantschek |
| 6,192,834 B1 | 2/2001 | Kolozsvari |
| 6,244,220 B1 | 6/2001 | Dawson |
| 6,283,062 B1 | 9/2001 | King |

FOREIGN PATENT DOCUMENTS

GB 002183983 A * 6/1987 ............ A01K/1/02

* cited by examiner

Primary Examiner—Robert P. Swiatek
(74) Attorney, Agent, or Firm—Jones, Tullar & Cooper, P.C.

(57) ABSTRACT

A cage, such as a bird or other animal cage, employs a folding side assembly that, using a specially designed hinging system, allows the cage to fold to a collapsed condition for storage or shipping, and then to be unfolded and secured to an open position without the need for screws, bolts or other types of fasteners, or the use of hand or other tools. In the preferred embodiment, the folding side assembly is formed of six permanently assembled sections, each of which is attached to adjacent sections by means of a plurality of pivoting hinges. These six sections form four sides of the cage, which preferably is rectangular or square. Two of the sections form two fixed side of the cage, while the remaining four sections form, in two hinged pairs, two folding sides of the cage. The pairs are hinged to one another so that the folding sides can fold inwardly toward one another in an accordion fashion so that the fixed sides of the cage collapse toward one another. Once the side assembly is opened for use, removable top and bottom sections or assemblies are secured by gravity to the folding side assembly that maintain the same in an open. unfolded position.

25 Claims, 6 Drawing Sheets

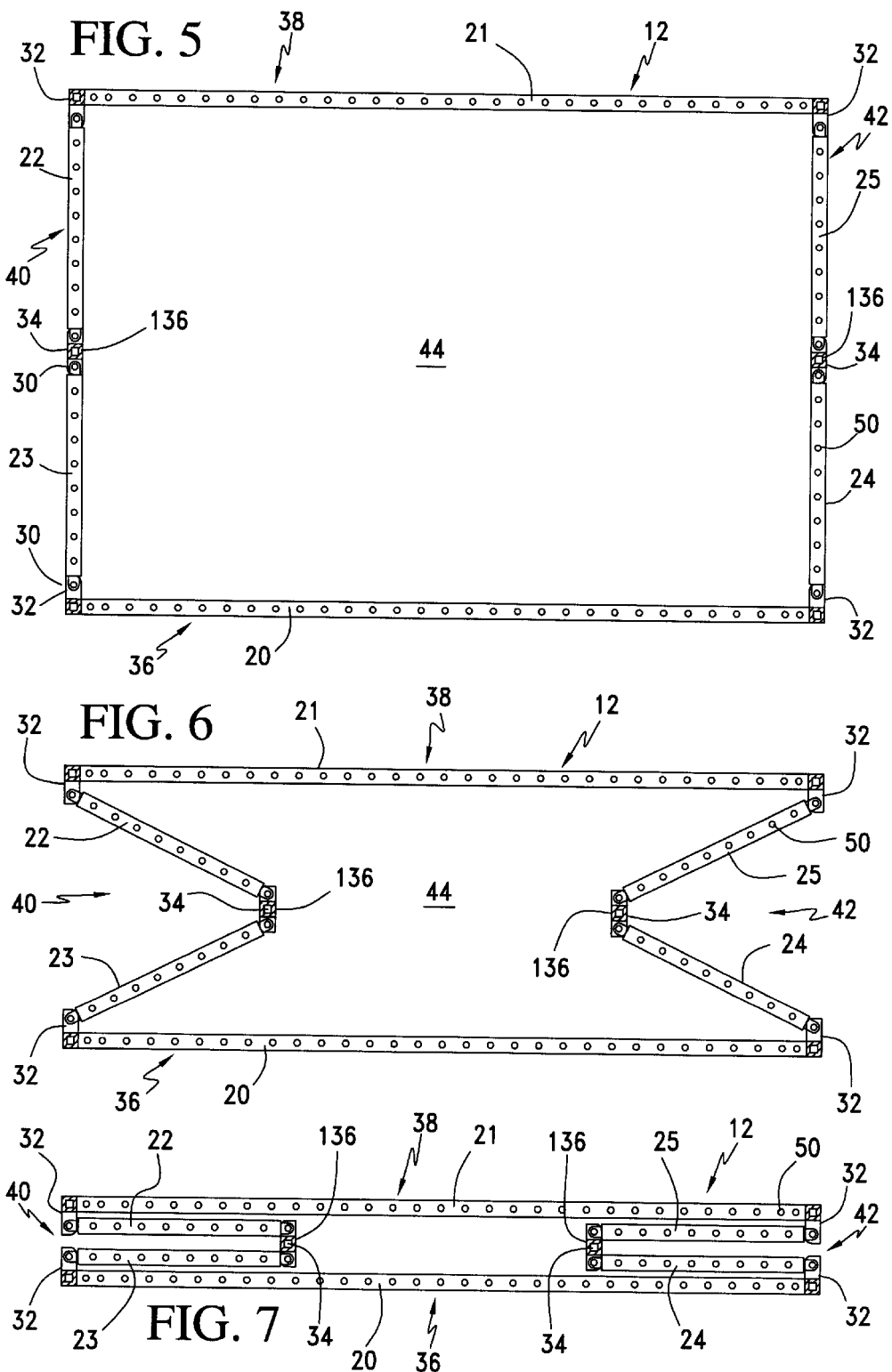

FOLDING CAGE

BACKGROUND OF THE INVENTION

The present invention relates in general to a cage that can be stored or transported in a folded, collapsed condition and can be quickly unfolded and assembled for use without the use of screws, bolts or other types of fasteners.

Manufacturers of animal cages, such as bird cages, typically sell the cages to wholesalers or retailers in an unassembled condition, since the cages take up too much space if stored or shipped already assembled. Unfortunately, assembly of one of these cages can be a time consuming, tedious task requiring use of many screws, bolts, nuts or other fasteners. A need therefore exists for an animal cage design that allows the cage to be collapsed or compacted for shipping, but assembled quickly and without the need for screws, bolts or other types of fasteners.

SUMMARY OF THE INVENTION

To fulfill the foregoing need, the present invention provides a cage that employs a specially designed hinging system that allows the cage to fold to a collapsed condition for storage or shipping, and then to be unfolded and secured to an open position without the need for any type of fastening means, such as screws, bolts, etc., or the use of hand tools, or the like. More particularly, the invention comprises a cage that includes a folding side assembly and removable top and bottom sections or assemblies which, when secured to the folding side assembly, maintain the same in an open, unfolded position.

In a preferred embodiment, the folding side assembly is formed of six permanently assembled sections, each of which is attached to adjacent sections by means of a plurality of pivoting hinges. These six sections form four sides of the cage, which preferably is rectangular or square. Two of the sections form two fixed sides of the cage, while the remaining four sections form, in two hinged pairs, two folding sides of the cage. The pairs are hinged to one another so that the folding sides can fold inwardly toward one another and cause the fixed sides of the cage to collapse toward one another in an accordion fashion.

Preferably, the cage side sections are each constructed of a metal tubing frame and a plurality of spaced, vertical cage rods or bars. To facilitate hinging of the side sections to one another, two and three-piece hinge designs are employed. The fixed sides are attached to the folding sides by means of a plurality of two-piece hinges. Each of these hinges includes a first hinge plate or that is permanently secured to a frame tube of the fixed side and a second hinge plate that is permanently secured to a frame tube of the folding side section. The hinge plates have apertures therein that are lined up with one another for receipt of a pivot pin that secures the hinge plates to one another. The pivot pin can be a rivet, screw or equivalent, or in many instances, can be one of the cage rods or bars. Similarly, the hinged sections of the folding sides are secured to one another with three-piece hinges. Each of these hinges includes a first hinge plate that is permanently secured to a frame tube of the first folding side section and a second hinge plate that is permanently secured to a frame tube of the second folding side section. A third hinge plate is secured at one end to the first hinge plate, at the other end to the second hinge plate, and in the middle to a vertical frame tube to which hinge plates for a number of other hinges are also secured.

In the preferred embodiment, square, hollow metal tubing is employed in the frame tubes of the various side sections. The three-piece hinges that connect the folding side sections to one another are designed in such a way that when the side assembly is unfolded to its open position, the hinge plates are flush with the square frame tubes. This is achieved by using three-sided hinge plates having u-shaped cross sections. The first and second hinge plates include first ends that are press fit or otherwise secured in the ends of the hollow metal frame tubes of the adjacent folding side sections, and second ends that fit within the two ends of the third hinge plate. The third hinge plate is dimensioned so that its three sides are the same size as the sides of the frame tubes. In addition, ends of the three hinge plates that are connected to each other have rounded edges to facilitate unimpeded pivoting action.

Once the cage side assembly is unfolded, a fixed top and a bottom frame panel are secured thereto, thus fixing the cage in its open position, again, without the use of any type of fasteners. In particular, a top section is positioned by means of a group of vertical pins extending from the top frame members of the side assembly and a plurality of corresponding apertures in the top section. In addition, the bottom frame panel is positioned within a lower horizontal frame section of the unfolded side assembly and is held in position by a plurality of L-shaped clips that are permanently attached to the bottom frame panel and have ends that rest on top of the horizontal frame tubes of the side assembly. Once the top section and the bottom frame panel are in position, gravity holds them in place and the side assembly is thus secured in its open position, thereby also eliminating the need for any type of latching mechanism.

BRIEF DESCRIPTION OF THE DRAWINGS

The features and advantages of the present invention will become apparent from the following detailed description of a preferred embodiment thereof, taken in conjunction with the accompanying drawings, in which:

FIGS. 5–7 are top sectional views of the folding side assembly of FIGS. 2 and 3, showing the side assembly in open, partially folded and fully folded or collapsed positions, respectively;

DETAILED DESCRIPTION OF A PREFERRED EMBODIMENT

Figure 1:
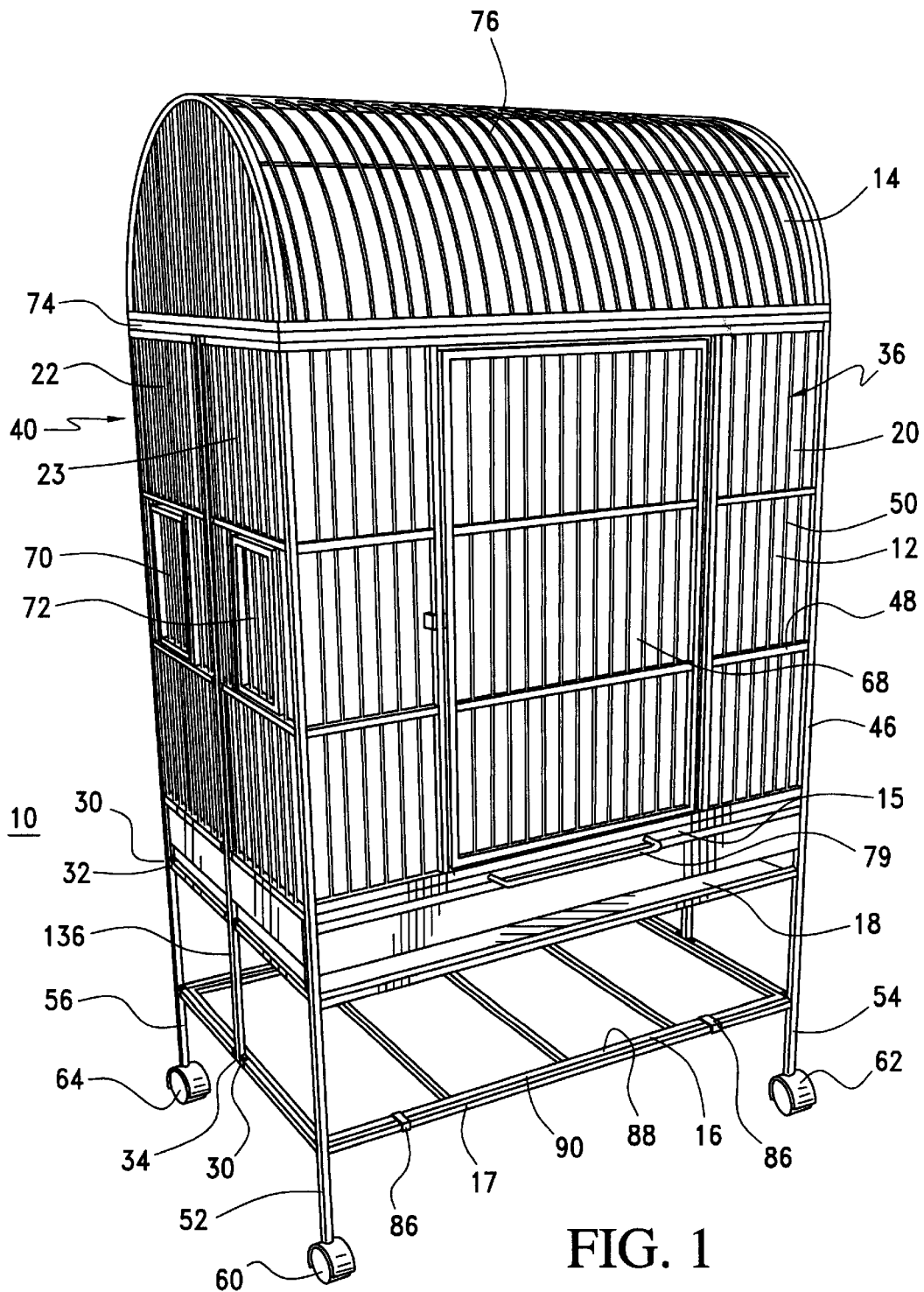
FIG. 1 is a perspective illustration of a cage constructed in accordance with the preferred embodiment.

With reference to FIGS. 1–4, a cage 10 is illustrated that is particularly designed for use as a birdcage, but could be used for containing other animals as well. The cage 10 includes a folding side assembly 12, a top 14 and a sliding removable cage bottom panel 15 that forms a bottom to the cage. A bottom frame panel 16 fits within a lower horizontal frame section 17 of the folding assembly 12. The bottom frame panel 16 is employed along with the top 14 to secure the folding assembly 12 in an open position as will be discussed in greater detail later. A sliding removable tray 18 is also provided that is positioned beneath the cage bottom panel 15 that serves to catch seeds or other debris.

Figure 2:
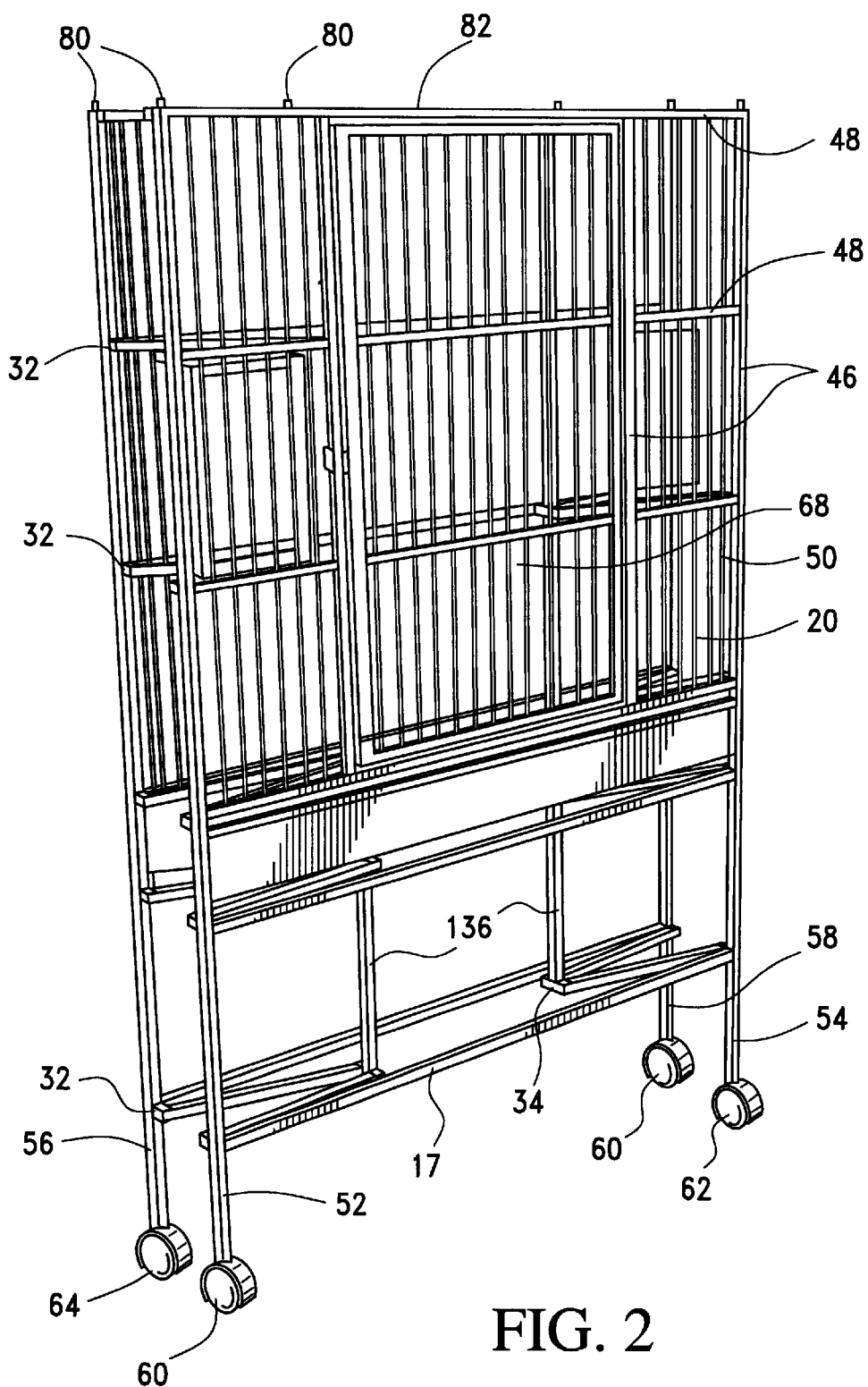
FIG. 2 is a perspective illustration of a cage side assembly that is employed in the cage of FIG. 1 and is shown in a folded position.
Figure 3:
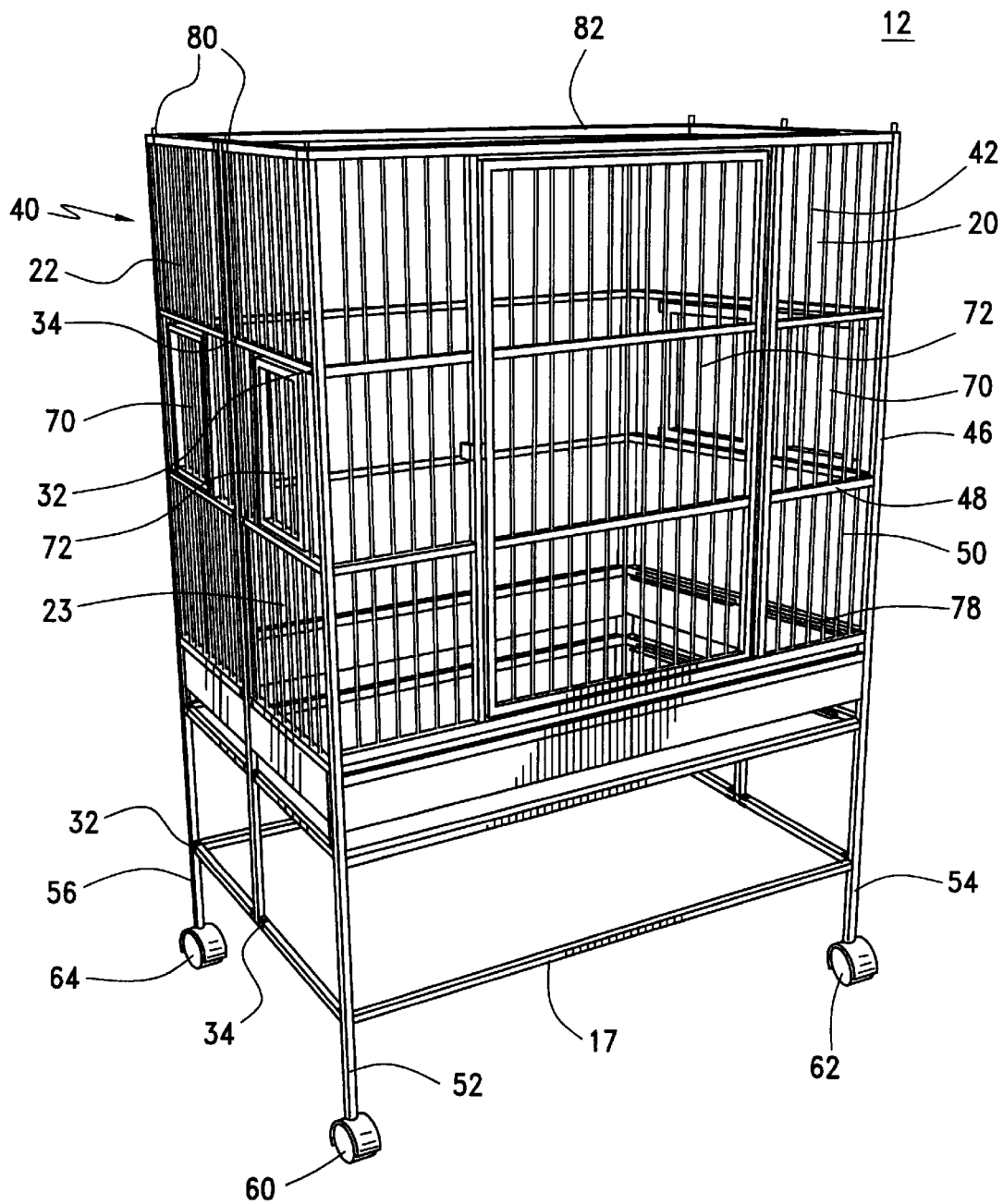
FIG. 3 is a perspective illustration of the cage side assembly of FIG. 2 shown in an unfolded position ready for assembly.
Figure 4:
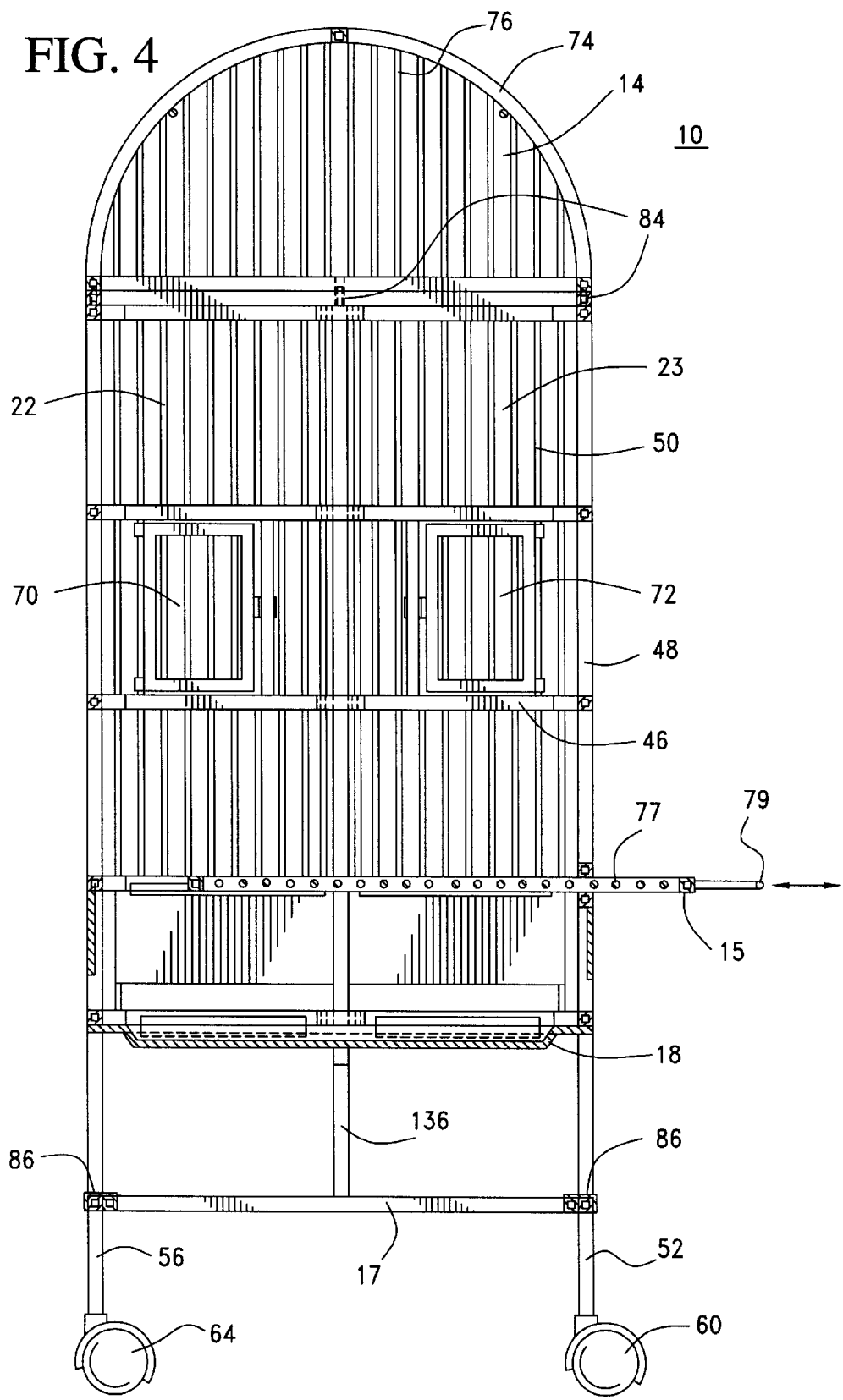
FIG. 4 is a side elevation cross sectional view of the assembled cage of FIG. 1.

The folding side assembly 12 is shown by itself in a folded position in FIG. 2 and in an open position in FIG. 3. The folding side assembly 12 includes a group of six side sections 20, 21, 22, 23, 24 and 25 as best illustrated in the sectional views of FIGS. 5–7, each of which is pivotally attached to adjacent sections by means of a plurality of hinges 30. The hinges 30 include a plurality of two-piece hinges 32 and a second plurality of three-piece hinges 34, both types of which will be discussed in greater detail later in conjunction with FIGS. 8–13.

The folding side assembly 12 is preferably a four-sided, rectangular or square structure when unfolded to its open position as illustrated in FIGS. 3 and 5, although it will be understood that the fundamental concepts of the present invention could be embodied in other shaped structures as well. The first and second side sections 20 and 21 form first and second fixed opposed sides 36 and 38 of the cage 10, the third and fourth side sections 22 and 23 form a first folding side 40 of the cage 10, and the fifth and sixth side sections 24 and 25 form a second folding side 42 of the cage 10. As illustrated best in FIGS. S and 6, the folding sides 38 and 40 are designed to fold inwardly toward an interior 44 of the cage 10, thereby causing the fixed sides 36 and 38 to collapse toward one another in an accordion fashion. This arrangement is more desirable than would be a four section arrangement in which the cage assembly could fold closed, but would be double in length in the closed position, thereby presenting a storage space problem.

Each of the six side sections 20–25 of the folding side assembly 12 is formed from a plurality of vertical and horizontal frame tubes 46 and 48, respectively, which are preferably formed from hollow metal tubing, with intersecting ones of the tubes being welded or otherwise bonded together. In the preferred embodiment, square tubing is employed, although other shapes, e.g., round, rectangular, etc., of tubing could be employed if desired. A plurality of vertically disposed, spaced, metal rods 50 form bars for the cage 10 that will prevent escape of a bird or other animal therein.

The first and second side sections 20 and 21 also each include a pair of legs 52, 54 and 56, 58, each having a corresponding wheel or caster 60, 62, 64 and 66 on the bottom end thereof. While the casters 60–66 facilitate easy handling of the cage 10, it will be understood that they are not necessary and could be replaced with fixed feet if desired. Further, the first side section 20 has a large door 68 formed therein for accessing the interior 44 of the cage 10, while the folding sides 40 and 42 each have two smaller doors 70 and 72 formed therein which are particularly suited for adding bird seed to feed cups (not shown) in the cage 10.

Referencing again FIG. 1, the top 14, like the side sections 20–25, is preferably formed from a plurality of hollow, square tubing frame members 74 and a plurality of spaced metal rods 76. The top 14 is shown as having an arched hemispherical cross section, but it should be understood that the top 14 could be of any desired shape, including flat, for example.

The sliding removable cage bottom panel 15 is preferably constructed in a manner similar to that of the bottom frame panel 16 in that it is formed of a rectangular metal tubing frame. In addition, as illustrated in cross section in FIG. 4, the cage bottom panel 15 includes a plurality of spaced-metal rods 77 that are of the same construction as that of the rods 50 and the rods 76 in the side assembly 12 and the top 14, respectively. As illustrated in FIG. 3, a plurality of lips 78 are disposed on the interior sides of a number of the horizontal frame tubes 48 in the side assembly 12 that act to support the sliding removable cage bottom panel 15 and tray 18. Also, as shown in FIG. 1, the cage bottom panel 15 has a handle 79 disposed thereon to facilitate easy insertion and removal into and from the side assembly 12.

As has been noted, a key feature of the invention is that the cage 10 can be assembled without the need for any types of fasteners, such as screws, bolts, nuts, etc., or the use of screwdrivers or other tools. To this end, the folding side assembly 12 can be unfolded to an open position as shown in FIG. 3 and then the top 14, bottom cage panel 15, bottom frame panel 16 and tray 18 can be positioned on the folding side assembly 12 without using any fasteners. More particularly, a group of six vertical pins 80 is disposed on a top 82 of the folding side assembly 12, one at each of the four corners thereof and two on top of the upper ones of the three-piece hinges 34. As illustrated by the dashed lines in the section of FIG. 4, the top 14 includes a corresponding group of six apertures 84 (three shown) that are positioned to each align with and receive a corresponding one of the six pins 80. In addition, the bottom frame panel 16 is sized to fit snuggly within the lower horizontal frame section 17 of the folding side assembly 12, and is supported in position therein by means of a group of four or more L-shaped tabs 86. The tabs 86 are each permanently attached, e.g., by welding, adhesive or other suitable attachment means, to a top side 88 of one of four outside frame elements 90 that form the frame panel 16. The tabs 86 each include an end 92 that extends outwardly and engages the lower horizontal frame section 17 to support the frame panel 16.

Since the frame panel 16 and the top 14 are fixed structures, the folding side assembly 12 is held thereby in an open position once the top 14 and the frame panel 16 are in position on the folding side assembly 12. As a result, there is no need for any type of latching mechanism to latch the folding assembly 12 open. In addition, no fasteners are necessary to secure the top 14 and frame panel 16 in position since the force of gravity is sufficient for this purpose.

Figure 8:
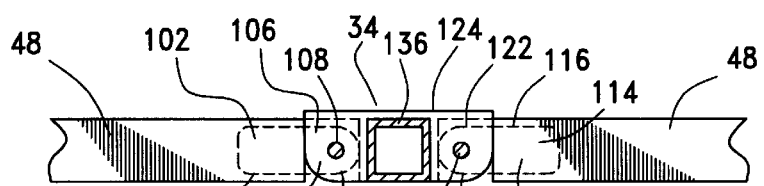
FIG. 8 is a top, partial cross section of a three-piece hinge that is employed in the side assembly and is shown in a fully unfolded or open position.
Figure 9:
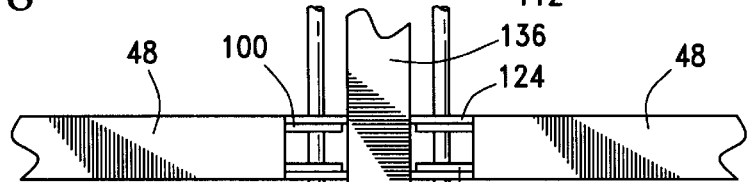
FIG. 9 is partial front elevation of the three-piece hinge of FIG. 8.
Figure 10:
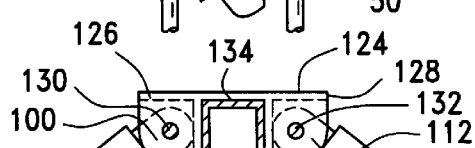
FIG. 10 is a top, partial cross section of the three-piece hinge of FIG. 8 that is shown in a partially folded position.

Another significant feature of the invention is the specific design of the two and three-piece hinges 32 and 34. FIGS. 8–13 show the two hinge designs in greater detail. One of the three-piece hinges 34 is illustrated in FIGS. 8–10. The hinge 34 includes a first hinge plate 100 having a first end 102 secured to one of the horizontal frame members 48 of the third or fifth side sections 22 or 24, preferably by being press fit into an open end 104 of the frame member 48. A second end 106 of the first hinge plate 100 has an aperture 108 disposed therein and a rounded edge 110 to facilitate unimpeded pivoting action. Similarly, a second hinge plate 112 has a first end 114 secured to one of the horizontal frame members 48 of the fourth or sixth side sections 24 or 28, preferably by being press fit into an open end 116 of the frame member 46. A second end 118 of the second hinge plate 112 has an aperture 120 disposed therein and a rounded edge 122 to facilitate unimpeded pivoting action. The hinge 34 also includes a third hinge plate 124 having first and second ends 126 and 128, each having an aperture 130 and 132 disposed therein. The third hinge plate 124 includes a central cutout section 134 that allows the third hinge plate 124 to be secured e.g., by welding, to a vertical tube 136, which extends most of the height of the folding side assembly as illustrated in FIG. 3, for example.

In the example shown in FIGS. 8–10, first and second ones of the cage rods 50 serve as pivot pins for the hinge 34. A first of the rods 50 passes through the aperture 108 in the second end 106 of the first hinge plate 100 and the aperture 130 in the first end 126 of the third hinge plate 124 for pivotally connecting the first and third hinge plates 100 and 124. Similarly, a second of the cage rods 50 passes through the aperture 120 in the second end 118 of the second hinge plate 112 and the aperture 132 in the second end 128 of the third hinge plate 124 for pivotally connecting the second and third hinge plates 100 and 124. It should be noted that any of the rods 50 that are used in this manner should be stiff enough to avoid excessive flexing, since any such rods would only be secured at their two ends and not to any of the horizontal frame members 48 that they pass through. Alternatively, conventional rivets or other suitable fasteners can be used as the pivot pins for the hinges 34 and are in fact used for the lower ones of the hinges 34 in the side assembly 12, since the cage rods 50 do not extend below the cage bottom panel 15.

As illustrated in FIGS. 8 and 10, the ends 126 and 128 of the third hinge plate 124 have rounded edges 140 and 142, respectively, that facilitate pivoting of the frame members 48 about the third hinge plate 124, while at the same time allowing a flush fit of the third hinge plate 34 with the frame members 48 when the folding side assembly 12 is in its open position as illustrated in FIG. 8. In addition, the third hinge plate 124 preferably has a u-shaped cross section and is sized to match the cross sectional size of the horizontal frame members 48 so that the hinges 34 are unobtrusive in appearance when the cage 10 is assembled.

Figure 11:
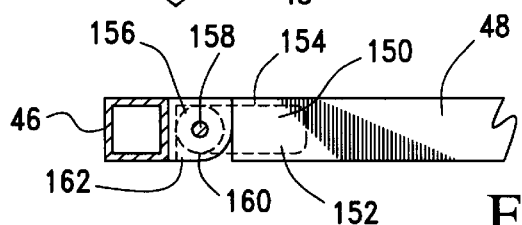
FIG. 11 is a top, partial cross section of a two-piece hinge that is employed in the side assembly and is shown in a fully unfolded or open position.
Figure 12:
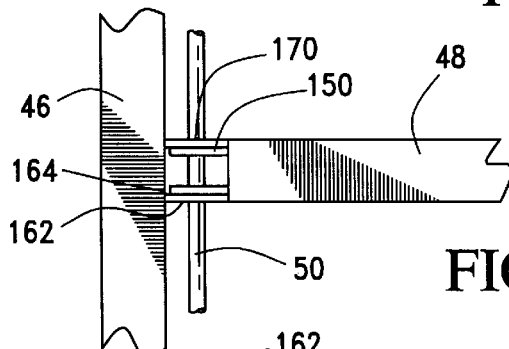
FIG. 12 is partial front elevation of the two piece hinge of FIG. 11.
Figure 13:
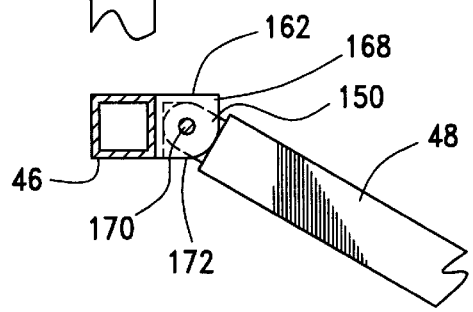
FIG. 13 is a top, partial cross section of the two-piece hinge of FIG. 11 that is shown in a partially folded position.

One of the two-piece hinges 32 is illustrated in FIGS. 11–13. The hinge 32 includes a first hinge plate 150 having a first end 152 secured to one of the horizontal frame members 48 of the third or fifth side sections 22 or 24, preferably by being press fit into an open end 154 of the frame member 48. A second end 156 of the first hinge plate 150 has an aperture 158 disposed therein and a rounded edge 160 to facilitate unimpeded pivoting action. A second hinge plate 162 has a first end 164 secured to one of the vertical frame members 46 of the first or second side sections 20 or 21, preferably by being welded or otherwise secured thereto. A second end 168 of the second hinge plate 162 has an aperture 170 disposed therein and a rounded edge 172 to facilitate unimpeded pivoting action. The second hinge plate 162 preferably has a u-shaped cross section and is sized to match the cross sectional size of the frame members 46 and 48 so that the hinges 32 are unobtrusive in appearance when the cage 10 is assembled.

In the example shown in FIGS. 11–13, one of the cage rods 50 serves as a pivot pin for the hinge 32. Again, however, as with the three-piece hinges 34, rivets or other suitable fasteners can be used for this purpose, and are in fact used for the lower ones of the hinges 32 in the side assembly 12 since the cage rods 50 do not extend below the cage bottom panel 15. A first of the rods 50 passes through the aperture 158 in the second end 156 of the first hinge plate 150 and the aperture 168 in the second end 170 of the second hinge plate 162 for pivotally connecting the two together.

In conclusion, the present invention provides a cage construction that facilitates easy assembly with no fasteners or tools required, yet allows the cage to be collapsed for storage or shipping. In addition, once assembled, the cage is sturdy in spite of the fact that no fasteners are used in its assembly due to the construction of the top and bottom panel that securely hold the folding side assembly in its open position. The use of flush fitting hinges provides an aesthetic appearance. In addition, the specific arrangement of two and three-piece hinges in a six sectioned side assembly results in the side assembly being able to fold inwardly in an accordion fashion, thereby minimizing storage space requirements.

Although the present invention has been disclosed in terms of a preferred embodiment and variations thereon, it will be understood that numerous additional modifications and variations could be made thereto without departing from the scope of the invention as defined by the following claims.

What is claimed is:

1. A cage comprising:
   a folding side assembly including a plurality of side sections, each of said side sections being attached to adjacent ones of said side sections with a plurality of pivoting hinges that allow said side assembly to fold into a collapsed position;
   a fixed top disposed on a top of said side assembly and held in position thereon by gravity, said top being configured to secure said folding side assembly in an open position when disposed thereon; and
   a bottom frame panel positioned within a lower frame section of said folding side assembly and held in position by gravity, said bottom frame panel also being configured to secure said folding side assembly in an open position when positioned within said lower frame section;
   whereby, said fixed top and said bottom frame panel can be assembled with said folding side assembly without the use of any fastening means and act to secure said folding side assembly in an open position.

2. The cage of claim 1, wherein a plurality of vertical pins are attached to said top of said side assembly and said fixed top includes a plurality of corresponding apertures for receiving said pins and thereby assist in securing said side assembly in a open position.

3. The cage of claim 2, wherein said bottom frame panel has a plurality of tabs secured to a top side thereof which extend outwardly for engagement with said lower frame section of said folding side assembly to thereby assist in securing said side assembly in a open position.

4. The cage of claim 1, wherein said folding side assembly is a four sided rectangle or square when opened and includes six of said side sections, a first and a second of which form first and second opposing fixed sides of said assembly, a third and a fourth of which form, a first folding side and a fifth and a sixth of which form a second, opposing folding side.

5. The cage of claim 4, wherein said first and second folding sides are hinged to one another so that during closing of said side assembly, said first and second folding sides fold inwardly toward an interior of said folding side assembly, thereby causing said first and second sides to collapse toward one another.

6. The cage of claim 4, wherein said third and fourth side sections, and said fifth and sixth side sections are connected to each other by means of a plurality of three-piece hinges, each of said hinges including a first hinge plate having a first end secured to said third or fifth section and a second end having an aperture therein; a second hinge plate having a first end secured to said fourth or sixth section and a second end having an aperture therein; a third hinge plate having first and second ends, each having an aperture therein; a first pivot pin disposed in said aperture in said second end of said first hinge plate and said aperture in said first end of said third hinge plate for pivotally connecting said first and third hinge plates; and, a second pivot pin disposed in said aperture in said second end of said second hinge plate and said aperture in said second end of said third hinge plate for pivotally connecting said second and third hinge plates.

7. The cage of claim 6, further including a first vertical tube positioned between said third and fourth side sections, and a second vertical tube positioned between said fifth and sixth side sections, wherein said third hinge plate of each of said three-piece hinges is affixed to one of said first and second vertical tubes.

8. The cage of claim 6, wherein each of said side sections includes a plurality of vertical, spaced cage bars and at least some of said three-piece hinges utilize first and second of said cage bars as said first and second pivot pins.

9. The cage of claim 6, wherein each of said side sections is formed of a plurality of hollow frame tubes, and said first ends of said first and second hinge plates are press fit into an one end of a corresponding one of said hollow frame tubes.

10. The cage of claim 9, wherein said third hinge plate is sized and shaped to fit flush with the frame tubes of adjacent ones of said side sections when said folding side assembly is in an open position.

11. The cage of claim 10, wherein said second ends of said first and second hinge plates and said first and second ends of said third hinge plate have rounded edges to facilitate unimpeded pivoting and flush fitting of said third hinge plate with said frame tubes when said folding side assembly is in an open position.

12. The cage of claim 11, wherein said frame tubes have a square cross section and said first, second and third hinge plates have u-shaped cross sections.

13. The cage of claim 4, wherein said first and second fixed sides are each connected to said first and second folding sides by means of a plurality of two-piece hinges, each of said hinges including a first hinge plate having a first end secured to said first or second fixed side and a second end having an aperture therein; a second hinge plate having a first end secured to said first or second folding side and a second end having an aperture therein; and, a pivot pin disposed in said apertures in said second ends of said first and second hinge plates for pivotally connecting said first and second hinge plates.

14. The cage of claim 13, wherein each of said side sections includes a plurality of vertical, spaced cage bars and at least some of said two-piece hinges utilize one of said cage bars as said pivot pin.

15. A cage comprising:
a folding side assembly which forms a four sided rectangle or square when opened and includes a group of six side sections, a first and a second of which form first and second opposing fixed sides of said assembly, a third and a fourth of which form a first folding side and a fifth and a sixth of which form a second, opposing folding side, wherein said first and second folding sides are hinged to one another so that during closing of said side assembly, said first and second folding sides fold inwardly toward an interior of said folding side assembly, thereby causing said first and second sides to collapse toward one another;
a plurality of three-piece hinges connecting said third and fourth side sections, and connecting said fifth and sixth side sections, each of said hinges including a first hinge plate having a first end secured to said third or fifth section and a second end having an aperture therein; a second hinge plate having a first end secured to said fourth or sixth section and a second end having an aperture therein; a third hinge plate having first and second ends, each having an aperture therein; a first pivot pin disposed in said aperture in said second end of said first hinge plate and said aperture in said first end of said third hinge plate for pivotally connecting said first and third hinge plates; and, a second pivot pin disposed in said aperture in said second end of said second hinge plate and said aperture in said second end of said third hinge plate for pivotally connecting said second and third hinge plates;
a first vertical tube positioned between said third and fourth side sections, and a second vertical tube positioned between said fifth and sixth side sections, wherein said third hinge plate of each of said three-piece hinges is affixed to one of said first and second vertical tubes.
a top disposed on a top of said side assembly; and
a bottom frame panel positioned within a lower frame section of said folding side assembly.

16. The cage of claim 15, wherein a plurality of vertical pins are attached to said top of said side assembly and said fixed top includes a plurality of corresponding apertures for receiving said pins and thereby assist in securing said side assembly in a open position.

17. The cage of claim 16, wherein said bottom frame panel has a plurality of tabs secured to a top side thereof which extend outwardly for gravity induced engagement with said lower frame section of said folding side assembly to thereby assist in securing said side assembly in a open position.

18. The cage of claim 15, wherein each of said side sections includes a plurality of vertical, spaced cage bars and at least some of said three-piece hinges utilize first and second of said cage bars as said first and second pivot pins.

19. The cage of claim 15, wherein each of said side sections is formed of a plurality of hollow frame tubes, and said first ends of said first and second hinge plates are press fit into one end of a corresponding one of said hollow frame tubes.

20. The cage of claim 15, wherein said third hinge plate is sized and shaped to fit flush with the frame tubes of adjacent ones of said side sections when said folding side assembly is in an open position.

21. The cage of claim 20, wherein said second ends of said first and second hinge plates and said first and second ends of said third hinge plate have rounded edges to facilitate unimpeded pivoting and flush fitting of said third hinge plate with said frame tubes when said folding side assembly is in an open position.

22. The cage of claim 21, wherein said frame tubes have a square cross section and said first, second and third hinge plates have u-shaped cross sections.

23. The cage of claim 15, wherein said first and second fixed sides are each connected to said first and second folding sides by means of a plurality of two-piece hinges, each of said hinges including a first hinge plate having a first end secured to said first or second fixed side and a second end having an aperture therein; a second hinge plate having a first end secured to said first or second folding side and a second end having an aperture therein; and, a pivot pin disposed in said apertures in said second ends of said first and second hinge plates for pivotally connecting said first and second hinge plates; and, wherein each of said side sections includes a plurality of vertical, spaced cage bars and at least some of said two-piece hinges utilize one of said cage bars as said pivot pin.

24. A cage comprising:
- a folding side assembly which forms a four sided rectangle or square when opened and includes a group of six side sections, a first and a second of which form first and second opposing fixed sides of said assembly, a third and a fourth of which form, a first folding side and a fifth and a sixth of which form a second, opposing folding side, wherein said first and second folding sides are hinged to one another so that during closing of said side assembly, said first and second folding sides fold inwardly toward an interior of said folding side assembly, thereby causing said first and second sides to collapse toward one another;
- wherein said first and second fixed sides are each connected to said first and second folding sides by means of a plurality of two-piece hinges, each of said hinges including a first hinge plate having a first end secured to said first or second fixed side and a second end having an aperture therein; a second hinge plate having a first end secured to said first or second folding side and a second end having an aperture therein; and, a pivot pin disposed in said apertures in said second ends of said first and second hinge plates for pivotally connecting said first and second hinge plates;
- a top disposed on a top of said side assembly; and
- a bottom frame panel positioned within a lower frame section of said folding side assembly.

25. The cage of claim 24, wherein each of said side sections includes a plurality of vertical, spaced cage bars and at least some of said two-piece hinges utilize one of said cage bars as said pivot pin.

* * * * *